United States Patent
Lee

(10) Patent No.: US 6,654,178 B1
(45) Date of Patent: Nov. 25, 2003

(54) IMMERSED NON-POLARIZING BEAMSPLITTERS

(75) Inventor: Hak Chu Lee, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 52 days.

(21) Appl. No.: 10/219,641

(22) Filed: Aug. 14, 2002

(51) Int. Cl.[7] ............................................... G02B 27/14
(52) U.S. Cl. ........................................ 359/634; 359/629
(58) Field of Search ................................. 359/256, 282, 359/384, 487, 490, 583, 618, 634, 629; 355/46; 360/114.04; 354/406; 369/110.01; 385/47

(56) References Cited

U.S. PATENT DOCUMENTS

| | | | | |
|---|---|---|---|---|
| 4,373,782 A | * | 2/1983 | Thelen | 359/124 |
| 4,431,258 A | * | 2/1984 | Fye | 359/129 |
| 5,808,798 A | * | 9/1998 | Weber et al. | 359/583 |

OTHER PUBLICATIONS

Thelen, Alfred, "Nonpolarizing Interference Films Inside A Glass Cube" Applied Optics, vol. 15, No. 12, pp. 2983–2985 (Dec. 1976).

Baumeister, Philip, UCLA Thin Film Coating Technology Class Notes for Engineering 823.17, pp. 2–27, 2–29, 6–31 to 6–40 (1990).

* cited by examiner

Primary Examiner—Jordan M. Schwartz
Assistant Examiner—Jessica Stultz

(57) ABSTRACT

An immersed non-polarizing beamsplitter includes thin film groups and one or more additional thin films. Each of the thin film groups by itself fails to provide a non-polarizing reflection, but the combination of the thin film groups and the additional thin films provides a non-polarizing reflection. Each thin film group can consist of four layers, one of a higher refractive index material, two of an intermediate refractive index material, and one of a lower refractive index material, and at least one of the additional thin films is made of a material not used in the thin film groups. The additional thin films can precede, be between, or follow the thin film groups along the path of light through the beamsplitter. The order of the thin films in the groups can all be the same or can vary to improve performance of the non-polarizing beamsplitter.

23 Claims, 5 Drawing Sheets

IMMERSED NON-POLARIZING BEAMSPLITTERS

REFERENCE TO COMPUTER PROGRAM LISTING

This patent document includes a computer program listing appendix that was submitted on a compact disc containing the following files: NPBS1, created Aug. 14, 2002, having an on-disk size of 16.0 kbits; NPBS2, created Aug. 14, 2002, having an on-disk size of 16.0 kbits; NPBS3, created Aug. 14, 2002, having an on-disk size of 16.0 kbits; NPBS4, created Aug. 14, 2002, having an on-disk size of 16.0 kbits; NPBS5, created Aug. 14, 2002, having an on-disk size of 16.0 kbits; NPBS6, created Aug. 14, 2002, having an on-disk size of 16.0 kbits; and NPBS7, created Aug. 14, 2002, having an on-disk size of 16.0 kbits. The material on the compact disc is hereby incorporated by reference herein in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Conventional non-polarizing beamsplitters that are constructed from reflective thin film coatings split an incident beam into a reflected beam and a transmitted beam that have the same polarization as the incident beam. Constructing a non-polarizing beamsplitter can be complicated because for most non-absorbing thin films, the reflectance for the P-polarized beam component (i.e., the component having an electric field in a plane defined by the incident and reflected beams) differs from the reflectance for the S-polarized beam component (i.e., the component having an electric field perpendicular to the plane defined by the incident and reflected beams). The difficulty of constructing a non-polarizing beamsplitter increases in an immersed system where thin film coatings are sandwiched between optical elements.

FIG. 1A illustrates an immersed non-polarizing beamsplitter 100. Beamsplitter 100 includes a beamsplitter coating 120 between optical elements 110 and 130. Optical elements 110 and 130 can be prisms, plates, or other elements made of a material such as an optical quality glass. FIG. 1A specifically shows a configuration where optical elements 110 and 130 are right angle prisms, and an incident monochromatic beam 140 is along a path perpendicular to an input surface of optical element 110 and at an angle of 45° with beamsplitter coating 120. As a result, a reflected beam 150 exits perpendicular to an output face of optical element 110, and a transmitted beam 160 exists perpendicular to an output face of optical element 130.

To make beamsplitter 100 non-polarizing, beamsplitter coating 120 is such that for the selected wavelength, S-polarized light and P-polarized light in beam 140 have the same reflectance from beamsplitter coating 120 and the same transmittance through beamsplitter coating 120. FIG. 1B shows the structure of beamsplitter coating 120, which includes 4Q thin films 120-1 to 120-4Q formed of materials having different refractive indices. The choices of materials and thicknesses of thin films 120-1 to 120-4Q provide beamsplitter 100 with the desired reflectance and transmittance of incident beam 140. Incident beam 140, which arrives through optical element 110, partially reflects at the interface between optical element 110 and thin film 120-1, each interface between adjacent pairs of thin films [120-1, 120-2] to [120-(N−1),120-4Q], and the interface between thin 120-4Q and optical element 130. The partial reflections combine and interfere to form reflected beam 150, while the portion of incident beam 140 not reflected (and not absorbed) becomes a transmitted beam 160.

Equations 1 are formulas for the reflection coefficients rs and rp respectively for S-polarized and P-polarized light in beamsplitter 100 when each of thin films 120-1 to 120-N has an optical thickness that is one quarter of the wavelength of incident beam 140. In Equations 1, values $N_0$, $N_1$ to $N_{4Q}$, and $N_{4Q+1}$ are the respective refractive indices of element 110, thin films 120-1 to 120-4Q, and element 130; and values $\theta_0$, $\theta_1$ to $\theta_{4Q}$, and $\theta_{4Q+1}$ are the respective propagation angles of the transmitted beams in element 110, thin films 120-1 to 120-4Q, and element 130.

Equations 1:

$$rs = \frac{1 - U*W}{1 + U*W}$$

$$rp = \frac{1 - U/W}{1 + U/W}$$

$$U = \frac{N_0 * N_2 * N_4 * \ldots N_{4Q}}{N_1 * N_3 * \ldots N_{4Q-1} * N_{4Q+1}}$$

$$W = \frac{\cos\theta_0 * \cos\theta_2 * \ldots \cos\theta_{4Q}}{\cos\theta_1 * \cos\theta_3 * \ldots \cos\theta_{4Q+1}}$$

A non-polarizing beamsplitter is equally efficient at reflecting S-polarized and P-polarized light. The reflection coefficient rs of non-polarizing beamsplitter 100 thus must be non-zero and equal in magnitude to the reflection coefficient rp of the non-polarizing beamsplitter 100. FIG. 1B illustrates a combination of thin films 120-1 to 120-4Q for which reflection coefficients rs and rp are non-zero and equal because one of factor W or U of Equations 1 is equal to 1 and the other factor U or W is not equal to 1. Non-polarizing beamsplitter 100 uses three materials H, M, and L for thin film layers 120-1 to 120-4Q and organizes thin film layers 120-1 to 120-4Q into Q groups of four layers each. Each group of four thin film layers includes a first layer of material M having an intermediate refractive index $N_M$, a second layer of material H having a higher refractive index $N_H$, a third layer of material M, and a fourth layer of material L having a low refractive index $N_L$. The three materials are selected so that refractive indices $N_H$, $N_M$, and $N_L$ make one factor W or U equal to 1.

Factor W of Equations 1 depends on the propagation angles $\theta_1$ to $\theta_{4Q}$ for light passing through thin films 120-1 to 120-4Q, and the propagation angles depend on the refractive indices $N_0$, $N_1$ to $N_{4Q}$, and $N_{4Q+1}$. Snell's Law as applied in Equation 2 indicates that the product of the refractive index and the sine of the propagation angle is a constant L for all of the thin films 120-1 to 120-4Q. Accordingly, any two of thin films 120-1 to 120-4Q that have the same refractive index will have the same propagation angle.

Equation 2

$$N_0*\sin\theta_0 = N_1*\sin\theta_1 = N_2*\sin\theta_2 \ldots = N_{4Q+1}*\sin\theta_{4Q+1} = L$$

In beamsplitter 100, thin films having refractive indices $N_M$, $N_H$, and $N_L$ respectively have propagation angles $\theta_M$, $\theta_H$, and $\theta_L$. When the elements 110 and 130 have the same refractive index, $\cos\theta_0$ is equal to $\cos\theta_{4Q+1}$, and use of propagation angles $\theta_M$, $\theta_H$, and $\theta_L$ simplifies the formula for factor W as illustrated in Equation 3. If incident angle $\theta_0$ (e.g., 45°) and refractive indices $N_M$, $N_H$, and $N_L$ make angles $\theta_M$, $\theta_H$, and $\theta_L$ satisfy Equation 4, factor W is equal to 1, and beamsplitter 100 is non-polarizing.

Equation 3:

$$W = \frac{\cos\theta_0 * \cos\theta_2 * \ldots \cos\theta_{4Q}}{\cos\theta_1 * \cos\theta_3 * \ldots \cos\theta_{4Q+1}} = \left(\frac{\cos\theta_H * \cos\theta_L}{\cos\theta_M * \cos\theta_M}\right)^Q$$

Equation 4:

$$\frac{\cos\theta_H * \cos\theta_L}{\cos\theta_M * \cos\theta_M} = 1$$

The materials suitable for optical-quality thin films 120 limit the available refractive indices. An exemplary solution for Equation 4 can be approximately achieved in non-polarizing beamsplitter 100 for light having a wavelength of about 633 nm and an incident angle $\theta_0$ of 45° by using aluminum oxide ($AL_2O_3$), titanium oxide ($TiO_2$), and magnesium fluoride ($MgF_2$) as materials H, M, and L, respectively. Titanium oxide ($TiO_2$) has a refractive index $N_H$ of about 2.27. Aluminum oxide ($AL_2O_3$) has a refractive index $N_M$ of about 1.62, and magnesium fluoride ($MgF_2$) with a refractive index $N_L$ of about 1.37. The intensity of reflected beam 150 for this solution depends on the number Q of groups of thin films. For Q equal to 5, the reflected power ratio Rs for S-polarized light is about 48.1%, and the reflected power ratio Rp for P-polarized light is about 52.6%, which are suitable for many applications of a 50% non-polarizing beamsplitter.

With the above structure, immersed non-polarizing beamsplitter 100 has a large number (e.g., 10) of thin films made of $AL_2O_3$. Thin films of $AL_2O_3$ can absorb water vapor from their surroundings, which results in mottling. This mottling can unpredictably change the phase profile of reflected and transmitted beams 150 and 160, and the accumulation of the phase profile changes from a larger number of thin film layers of $AL_2O_3$ can reach intolerable levels for precision optical systems such as interferometers. Non-polarizing beamsplitters having few or no thin film layers of $AL_2O_3$ and methods for designing non-polarizing beamsplitters having few or no thin film layers of problematic materials are thus sought.

SUMMARY

In accordance with an aspect of the invention, a non-polarizing beamsplitter contains multiple groups of thin film layers and one or more additional thin film layers. The thin film groups do not by themselves provide non-polarizing reflections, but the additional thin films compensate so that reflections and transmissions are non-polarizing. The additional thin film layers provide additional design freedom and the flexibility necessary to avoid the repeated layers of problematic materials such as $AL_2O_3$.

One specific embodiment of the invention is an immersed non-polarizing beamsplitter. The beamsplitter includes multiple thin film groups and one or more additional thin films. Each thin film group typically consists of a layer of a first material having a higher refractive index, two layers of a second material having an intermediate refractive index, and a layer of a third material having a lower refractive index. At least one of the additional thin films contains a fourth material that differs from the first, second, and third materials. Each of the additional thin films and the layers in the thin film groups has an optical thickness equal to one quarter of a wavelength of an incident light beam being split.

The additional thin film layers can precede, be between, or follow the thin film groups along a path of a transmitted beam of the beamsplitter. Generally, an even number of additional thin films fill the space between an adjacent pair of the thin film groups, but any number of additional films can precede or follow the thin film groups.

Each thin film group in some exemplary embodiments of the invention consists of: a layer of titanium oxide ($TiO_2$), which is the first material; two layers of yttrium oxide ($Y_2O_3$), which is the second material; and a layer of magnesium fluoride ($MgF2$), which is the third material. The order of the layers in the thin film groups can vary. A first additional thin film layer is a layer of aluminum oxide ($Al_2O_3$), which is the fourth material. A second additional thin film layer that is adjacent the first additional thin film layer can be made of the first, second, or third material, (e.g., $Y_2O_3$) to minimize the number of different materials required. The first and second additional thin film layers typically fill the space between two of the thin film groups. Using these materials, a non-polarizing beamsplitter coating that reflects about 50% of incident light having a wavelength of about 633 nm consists of six thin film groups, and the first and second additional thin film layers. A non-polarizing beamsplitter coating that reflects about 33% of incident light having a wavelength of about 633 nm consists of an initial thin film layer made of a material such as $MgF_2$, four thin film groups, the first additional thin film layer, and the second additional thin film layer.

Another embodiment of the invention is a design method for a non-polarizing beamsplitter. The method starts with selecting a set of materials to be used in thin film groups. A thin film group using the selected materials can fail to provide a non-polarizing reflection, and can thus be limited to materials having the most desirable properties. To the extent that the thin film groups fail to provide a non-polarizing reflection, a structure consisting of the thin film groups and one or more additional thin films can be selected. In selecting the structure, the number of the thin film groups can be selected according to a desired reflectance of the non-polarizing beamsplitter. The structures available for selection vary in the number and positions of the additional thin films. A calculation based on the selected structure indicates the requirements for a non-polarizing beamsplitter and determines at least one refractive index for at least one additional thin film layer. Materials having the calculated refractive indices are then sought. If no suitable material is identified as having one of the calculated refractive indices, another choice of materials for the thin film groups can be made, or another structure is selected and evaluated. If a suitable material is found, the dependence of the reflectance on wavelength can be evaluated for different ordering of the layers in the thin film groups and positions of the additional thin films relative to the thin film groups. Structures with particular materials and layer orders that provide the desired reflectance with minimal wavelength dependence can be constructed and experimentally evaluated.

BRIEF DESCRIPTION OF THE DRAWINGS

Use of the same reference symbols in different figures indicates similar or identical items.

DETAILED DESCRIPTION

In accordance with an aspect of the invention, a non-polarizing beamsplitter contains multiple thin film groups and one or more additional thin films. Each of the thin film groups alone fails to provide a non-polarizing reflection, but the additional thin films combined with the repeated thin film groups provide a non-polarizing reflection. The additional thin films also increase design freedom so that the thin films having undesirable properties can be avoided or minimized in number. Each thin film group generally consists of four layers including one layer of a material having a higher refractive index, one layer having a lower refractive index, and two layers having an intermediate refractive index. The order of the thin films in each group is such that the thin films of the material having the intermediate refractive index are either all even-numbered films or all odd-numbered films. The additional thin films can include an even number of films between two of the groups and/or any number of additional thin films before or after the thin film groups.

Figure 1A:
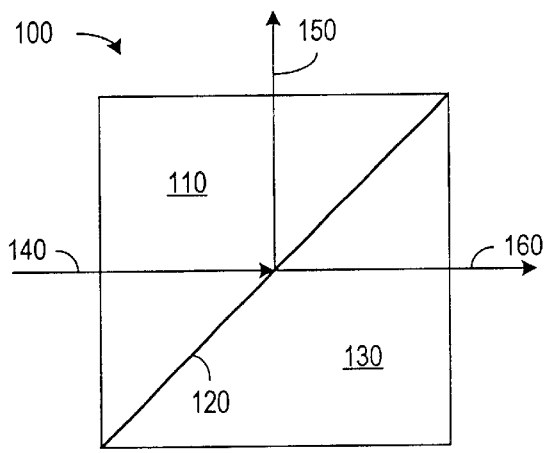
FIGS. 1A and 1B show a known immersed non-polarizing beamsplitter.
Figure 1B:
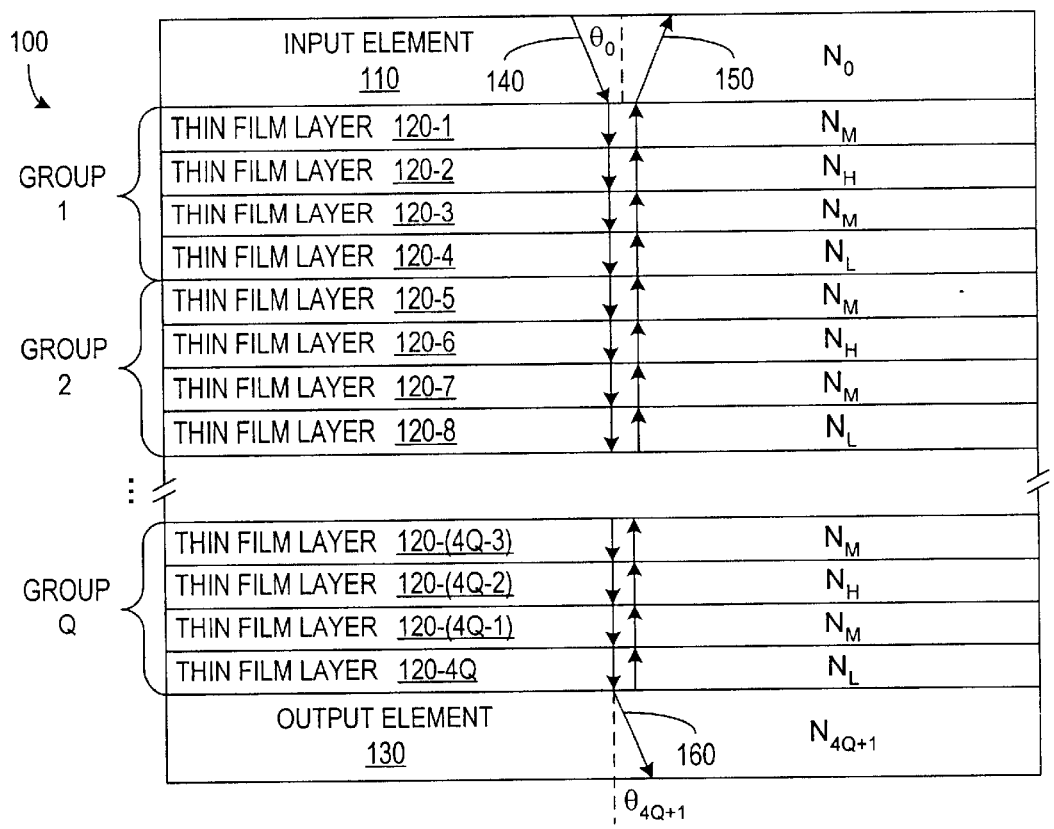
Figure 2:
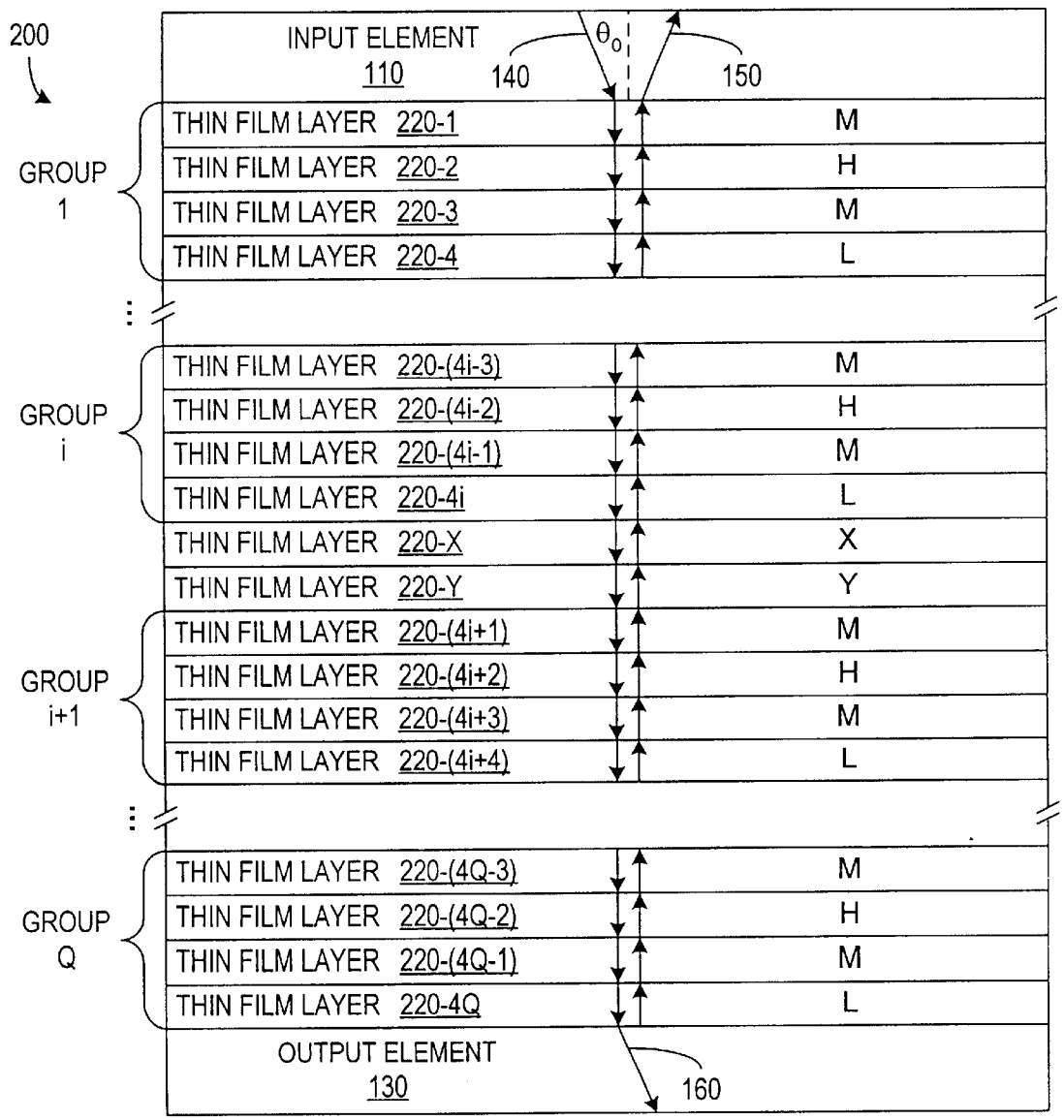
FIG. 2 shows an immersed non-polarizing beamsplitter in accordance with an embodiment of the invention including an even number of additional thin films between repeated groups of thin films.

FIG. 2 illustrates a non-polarizing beamsplitter 200 in accordance with an embodiment of the invention. Non-polarizing beamsplitter 200 includes thin films 220-1 to 220-4Q, 220-X, and 220-Y between optical elements 110 and 130. Optical elements 110 and 130 can generally be any type of optical element, but in an exemplary embodiment of the invention described herein optical elements 110 and 130 are right angle prisms made of an optical quality material such as BK-7 glass.

Each of thin films 220-1 to 220-4Q, 220-X, and 220-Y has a thickness such that the optical path length at the propagation angle through the thin film is one quarter of the wavelength (e.g., 633 nm) of the light. The thickness of each thin films 220-1 to 220-4Q, 220-X, and 220-Y thus vary in thickness according to the refractive index of the thin film and the wavelength and incidence angle $\theta_0$ of input beam 140. Thin films 220-1 to 220-4Q are organized into Q groups of four, with each of the thin film groups including one thin film having a refractive index $N_H$, two thin films of a material having a refractive index $N_M$, and one thin film having a refractive index $N_L$. Refractive index $N_H$ is greater than refractive index $N_M$, and refractive index $N_M$ is greater than refractive index $N_L$. Additional thin films 220-X and 220-Y have respective refractive indices $N_X$ and $N_Y$ and are between adjacent thin film groups i and i+1.

With the configuration of beamsplitter 200, factors U and W of Equations 1 apply and can be simplified as shown in Equations 5 when optical elements 110 and 130 have the same refractive index. In Equations 5, values $N_0$, $N_1$ to $N_{4Q}$, $N_X$, $N_Y$, and $N_{4Q+1}$ are the respective refractive indices of element 110, thin films 220-1 to 220-4Q, thin film 220-X, thin film 220-Y, and element 130; and values $\theta_0$, $\theta_1$ to $\theta_{4Q}$, $\theta_X$, $\theta_Y$, and $\theta_{4Q+1}$ are the respective propagation angles of the transmitted beams in element 110, thin films 220-1 to 220-4Q, thin film 220-X, thin film 220-Y, and element 130.

Equations 5:

$$U = \frac{N_0 * N_2 * N_4 * \ldots N_{4Q} * N_Y}{N_1 * N_3 * \ldots N_{4Q-1} * N_{4Q+1} * N_X} = \frac{N_Y}{N_X} * \left(\frac{N_H * N_L}{N_M * N_M}\right)^Q$$

$$W = \frac{\cos\theta_0 * \cos\theta_2 * \ldots \cos\theta_{4Q} * \cos\theta_Y}{\cos\theta_1 * \cos\theta_3 * \ldots \cos\theta_{4Q+1} * \cos\theta_X} = \frac{\cos\theta_Y}{\cos\theta_X} * \left(\frac{\cos\theta_H * \cos\theta_L}{\cos\theta_M * \cos\theta_M}\right)^Q$$

Figure 3:
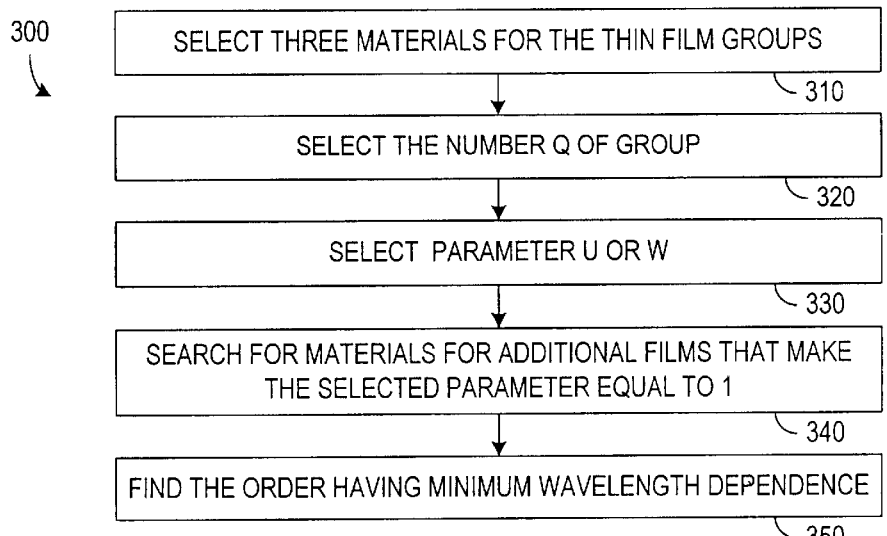
FIG. 3 is a flow diagram of a process for designing an immersed non-polarizing beamsplitter in accordance with an embodiment of the invention.

FIG. 3 illustrates a process 300 for finding a combination of thin films 220-1 to 220-4Q, 220-X, and 220-Y that makes beamsplitter 200 non-polarizing. Process 300 begins in step 310 with selecting three materials H, M, and L that can be used in thin films 220-1 to 220-4Q without ill effects such as mottling. $TiO_2$, $Y_2O_3$, and $MgF_2$ are examples of materials suitable for optical quality thin films 220-1 to 220-4Q. The selected materials H, M, and L for thin films 220-1 to 220-N have respective refractive indices $N_H$, $N_M$, and $N_L$, which control the values of $\cos\theta_H$, $\cos\theta_M$, and $\cos\theta_L$ for a given incidence angle $\theta_0$.

Step 320 selects the number Q of thin film groups. Number Q is generally selected according to the desired reflectance of beamsplitter 200. Factor U or W is then selected in step 330, and step 340 searches for a pair of materials X and Y for thin films 220-X and 220-Y having refractive indices $N_X$ and $N_Y$ or propagation angles $\theta_X$ and $\theta_Y$ that make the selected factor U or W equal to a target value (ideally 1). To reduce the number of thin-film materials used, either thin film 220-X or 220-Y can be made of one of the three materials used in the thin film groups, but at least one of thin films 220-X or 220-Y generally must be made of a fourth material not used in the thin film groups.

One search technique for step 340 selects a material (e.g., the material having refractive index $N_M$) for one thin film 220-X or 220-Y and calculates the refractive index required for the other thin film 220-Y or 220-X in order to make the selected factor U or W equal or nearly equal to the target value. For the structure of FIG. 2, materials X and Y must satisfy one of Equations 6 to make the selected factor U or W equal to 1 for the materials H, M, and L selected in step 310. Equations 6 show that the ratio of the terms for thin films 220-Y and 220-X is the multiplicative inverse of the combined factors from thin films 220-1 to 220-4Q and show that the refractive indices of the additional thin films X and Y depend on the number Q of thin film groups.

Equations 6:

$$\frac{N_X}{N_Y} = \left(\frac{N_H * N_L}{N_M * N_M}\right)^Q$$

-continued $$\frac{\cos\theta_X}{\cos\theta_Y} = \left(\frac{\cos\theta_H * \cos\theta_L}{\cos\theta_M * \cos\theta_M}\right)^Q$$

If the required refractive index $N_X$ or $N_Y$ is equal (or close) to the refractive index of a suitable material for the thin film 220-X or 220-Y, the beamsplitter can be constructed. The manufacturing process can improve beamsplitter performance by adjusting processing parameters to slightly vary the refractive indices $N_H$, $N_M$, or $N_L$ of materials H, M, or L and better satisfy the selected one of Equations 6. Methods for varying the refractive indices by adding impurities to materials such as $TiO_2$ or $Y_2O_3$ are known in the art.

Once the materials H, M, L, X, and, Y are selected, step 350 evaluates the wavelength dependence of the reflectance of the beamsplitter for a variety of different layer orders. Equations 1 to 6 indicate the reflection coefficients at the target wavelength and require that the optical thickness of thin films 220-1 to 220-4Q, 220-X, and 220-Y be one-quarter of the target wavelength. Inaccuracies in the fabrication process for beamsplitter 200 or in the wavelength of the incident light beam can change the reflectance of beamsplitter 200 or/and the degree to which beamsplitter 200 is non-polarizing. Ideally, functional dependences of the reflection coefficients rs and rp for beamsplitter 200 on wavelength are such that reflection coefficients rs and rp are equal and have a zero slope at the target wavelength, but the dependence of reflection coefficients rs and rp on wavelength can be calculated to predict the performance of non-polarizing beamsplitter coatings having a particular layer orderings.

Equations 1 and 5 can be examined to identify different layer orderings that have the same reflection coefficients rp and rs. In Equations 1 and 5, even-numbered thin films 220-2 to 220-4Q and 220-Y provide terms in the numerator of the expressions for factors U and W, and odd-numbered thin films 220-1 to 220-(4Q-1) and 220-X provide terms in the denominator of the expressions for factors U and W. Accordingly, any ordering of layers that preserves whether a particular layer is an even layer or an odd layer has the same reflection coefficients rs and rp at the target wavelength. In beamsplitter 200, the odd-numbered thin films 220-1 to 220-(4Q-1) have refractive index NM, and the even-numbered films 220-2 to 220-4Q have refractive index $N_H$ or $N_L$. The position of materials H and L can thus be swapped without changing the reflectance of beamsplitter 200 at the target wavelength. Beamsplitter 200 uses the same order of materials (i.e., MHML) for each thin film group, but using an alternative ordering of materials (i.e., MLMH) for any or all of the thin film groups in beamsplitter 200 does not change the predicted reflection coefficients of Equations 1. Similarly, moving layers 220-X and 220-Y from between one pair of thin film groups to between another pair of thin film groups does not change the reflection coefficients at the target wavelength. Changing or varying the order of materials (e.g., swapping H and L in one or more of the thin film groups or moving thin films 220-X and 220-Y to between another pair of thin film groups) can change the functional dependence of reflection coefficients rp and rs on wavelength.

Figure 4:
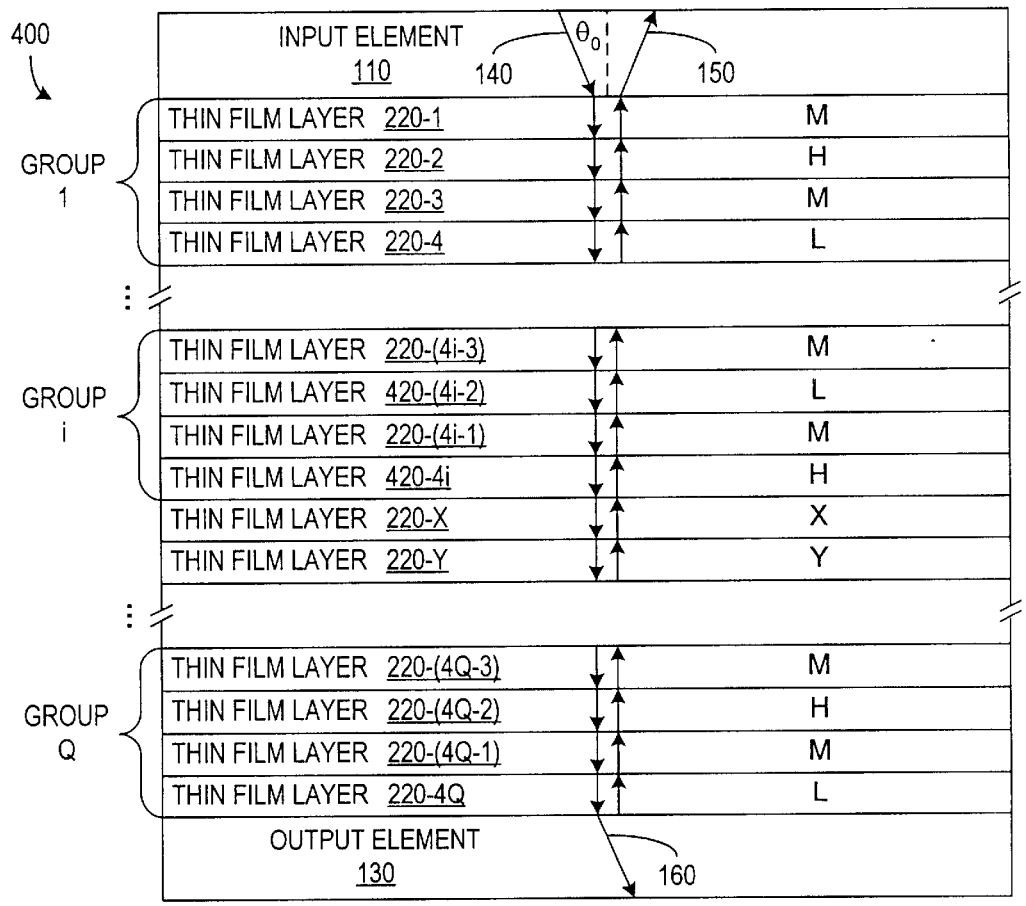
FIG. 4 shows an immersed non-polarizing beamsplitter in accordance with an embodiment of the invention including an even number of additional thin films between repeated groups of thin films and different ordering within one or more of the repeated groups.

FIG. 4 shows a non-polarizing beamsplitter 400, which is the same as beamsplitter 200 of FIG. 2 except for the order of materials in thin film group i. Swapping order of material H and L, particularly in a thin film group adjacent to the additional thin films 220-X and 220-Y has been found to improve the performance or wavelength dependence of a non-polarizing beamsplitter. An exemplary embodiment of non-polarizing beamsplitter 400 that reflects approximately 50% of 633-nm light has six thin film groups (i.e., Q=6) and additional films 220-X and 220-Y between the third and fourth groups (i.e., i=3). In this exemplary embodiment, material H is titanium oxide ($TiO_2$), which has a refractive index NH of about 2.31. Material M and material X are yttrium oxide ($Y_2O_3$), which has a refractive index NM of about 1.76. Material L is magnesium fluoride ($MgF_2$), which has a refractive index NL of about 1.37. Material Y is ($Al_2O_3$), which has a refractive index $N_M$ of about 1.62. As a result, factor U is about 1.00, and factor W is about 0.16. A single layer 220-Y of $Al_2O_3$, even if subject to mottling, still provides a high level of performance when compared to conventional non-polarizing beamsplitters that may include many (e.g., 10) thin film layers of $Al_2O_3$.

Another possible change of the order of thin films in the repeated groups of beamsplitter 200 (FIG. 2) or beamsplitter 400 (FIG. 4) changes the groups so that even-numbered thin films 220-1 tot 220-(4Q-1) have refractive index NM, and odd-numbered numbered films 220-2 to 220-4Q have refractive index $N_H$ or $N_L$. For these orderings (i.e., HMLM and LMHM) of materials H, M, and L in the thin film groups, a calculation of the required refractive indices $N_X$ and/or $N_Y$ is the same as above except that the materials of thin films 220-X and 220-Y are swapped.

Beamsplitters 200 and 400 use a pair of additional films 220-X and 220-Y between two of the repeated groups. Alternatively, any even number of additional films can be placed at one or more locations between the repeated groups. An examination of Equations 1 and 6 indicates that such a change would add additional factors to the numerator and denominator on the left-hand side of Equations 6 for a non-polarizing beamsplitter. An advantage of beamsplitters 200 and 400 over a non-polarizing beamsplitter having more than two additional thin film layers is the minimization of the number of additional layers in cases where the additional layers may contain a material having undesirable properties.

Figure 5:
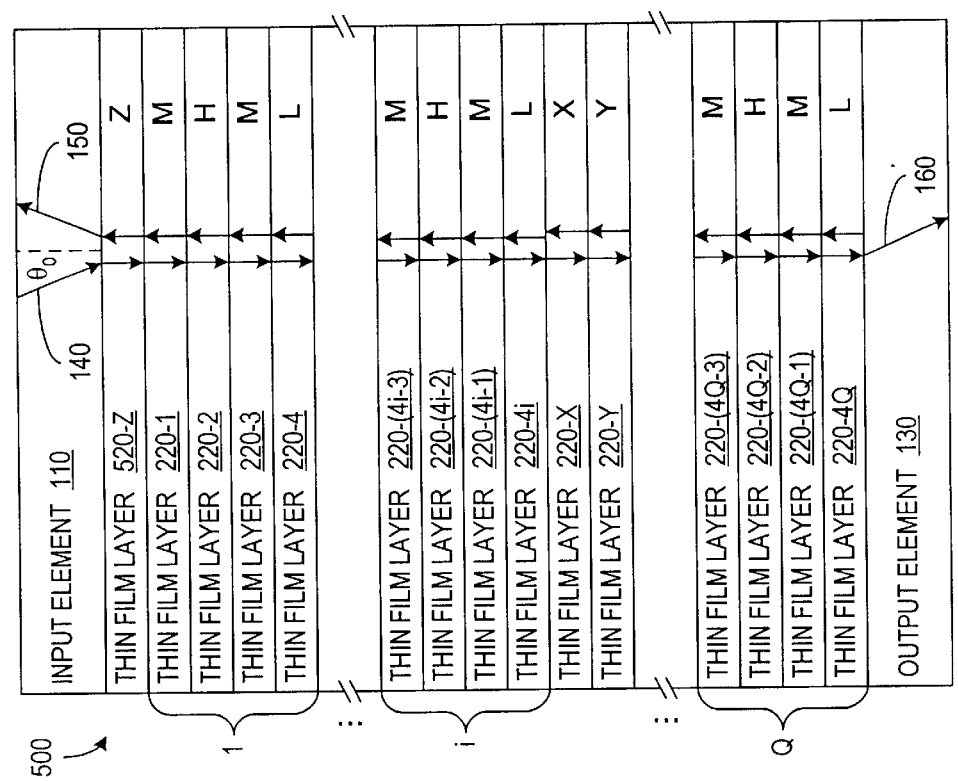
FIG. 5 shows an immersed non-polarizing beamsplitter in accordance with an embodiment of the invention including additional thin films before the repeated groups of thin films.

FIG. 5 illustrates a non-polarizing bearusplitter 500 in accordance with an embodiment of the invention having Q groups of thin films 220-1 to 220-4Q, an additional thin film layer 520-Z before the groups of thin films 220-1 to 220-Q, and additional thin films 220-X and 220-Y between two of the thin-film groups. As in the above embodiments, each of thin films 220-1 to 220-4Q, 220-X, 220-Y, and 520-Z has an optical path length equal to one-quarter wavelength of the light in the beam 140 being split. Equations 7 show formulas factors U and W of beamsplitter 500 when both optical elements 110 and 130 have the same refractive index $N_0$. Equations 7:

$$U = \frac{N_0 * N_2 * N_3 * \ldots N_{(4Q-1)} * N_{(4Q+1)} * N_X}{N_Z * N_2 * \ldots N_{4Q} * N_Y} = \frac{N_Y * N_0^2}{N_X * N_Z} *$$

$$\left(\frac{N_M * N_M}{N_H * N_L}\right)^Q$$

$$W = \frac{\cos\theta_0 * \cos\theta_1 * \ldots \cos\theta_{(4Q-1)} * \cos\theta_{(4Q+1)} * \cos\theta_Y}{\cos\theta_Z * \cos\theta_2 * \ldots \cos\theta_{4Q} * \cos\theta_X} =$$

$$\frac{\cos\theta_Y * \cos^2\theta_0}{\cos\theta_Z * \cos\theta_X} * \left(\frac{\cos\theta_H * \cos\theta_L}{\cos\theta_M * \cos\theta_M}\right)^Q$$

Process 300 of FIG. 3 can determine suitable materials for beamsplitter 500. In particular, step 310 selects materials H, M, and L that can be repeatedly used without ill effects on beamsplitter performance. Step 320 selects a number of thin film groups according to the desired reflectance. Steps 330 and 340 select a factor U or W and search for materials X, Y, and Z that make the selected factor U or W equal to the target value (e.g., 1). To make factor U or W equal to 1, materials X, Y, and Z have respective refractive indices $N_X$, $N_Y$, and $N_Z$ that satisfy one of Equations 8. Once the required materials are found, different orderings of the materials can be evaluated to minimize dependence on wavelength. Equations 8:

$$\frac{N_X * N_Z}{N_Y * N_0^2} = \left(\frac{N_H * N_L}{N_M * N_M}\right)^Q$$

$$\frac{\cos\theta_X * \cos\theta_Z}{\cos\theta_Y * \cos^2\theta_0} = \left(\frac{\cos\theta_H * \cos\theta_L}{\cos\theta_M * \cos\theta_M}\right)^Q$$

The order of the thin films in the repeated groups in beamsplitter 500 can be changed in the same manner described above for beamsplitter 200 (FIG. 2). In particular, each and any group can have an order MHML or MLMH without changing the theoretic requirements for materials X, Y, and Z that make beamsplitter 500 non-polarizing. Orders HMLM and/or LMHM could alternatively be used with an easily derived change on the conditions required for materials H, M, L, X, Y, and Z to make beamsplitter 500 non-polarizing.

Figure 6:
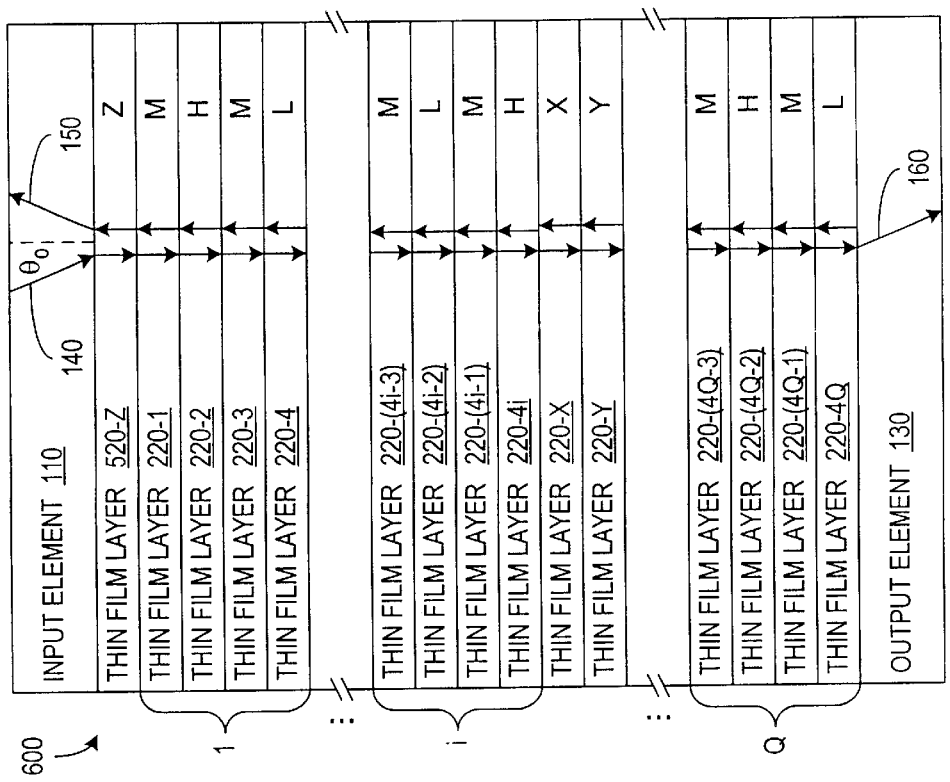
FIG. 6 shows an immersed non-polarizing beamsplitter in accordance with an embodiment of the invention including additional thin films before the repeated groups of thin films and different ordering within one or more of the repeated groups.

FIG. 6 illustrates a non-polarizing beamsplitter 600 that is the same as beamsplitter 500 except for the order of thin films in thin film group i. One exemplary embodiment of beamsplitter 600 that reflects about one third of the incident light has four thin film groups (i.e., Q=4) and uses materials $TiO_2$, $Y_2O_3$, and $MgF_2$ for materials H, M, and L, respectively. In the exemplary embodiment, materials $TiO_2$, $Y_2O_3$, and $MgF_2$ have respective refractive indices of about 2.29, 1.73, and 1.36, which can be achieved through control of processing parameters forming the thin film layers. To minimize the number of different materials, material Z is $MgF_2$, the same as material L, and material X is $Y_2O_3$, the same as material M. Choosing $Al_2O_3$, which has a refractive index of about 1.62, for material Y makes factor U approximately equal to 1. As noted above, a single layer of $Al_2O_3$ provides a high level of performance when compared to conventional non-polarizing beamsplitters that may include many (e.g., 10) thin film layers of $Al_2O_3$.

Figure 7:
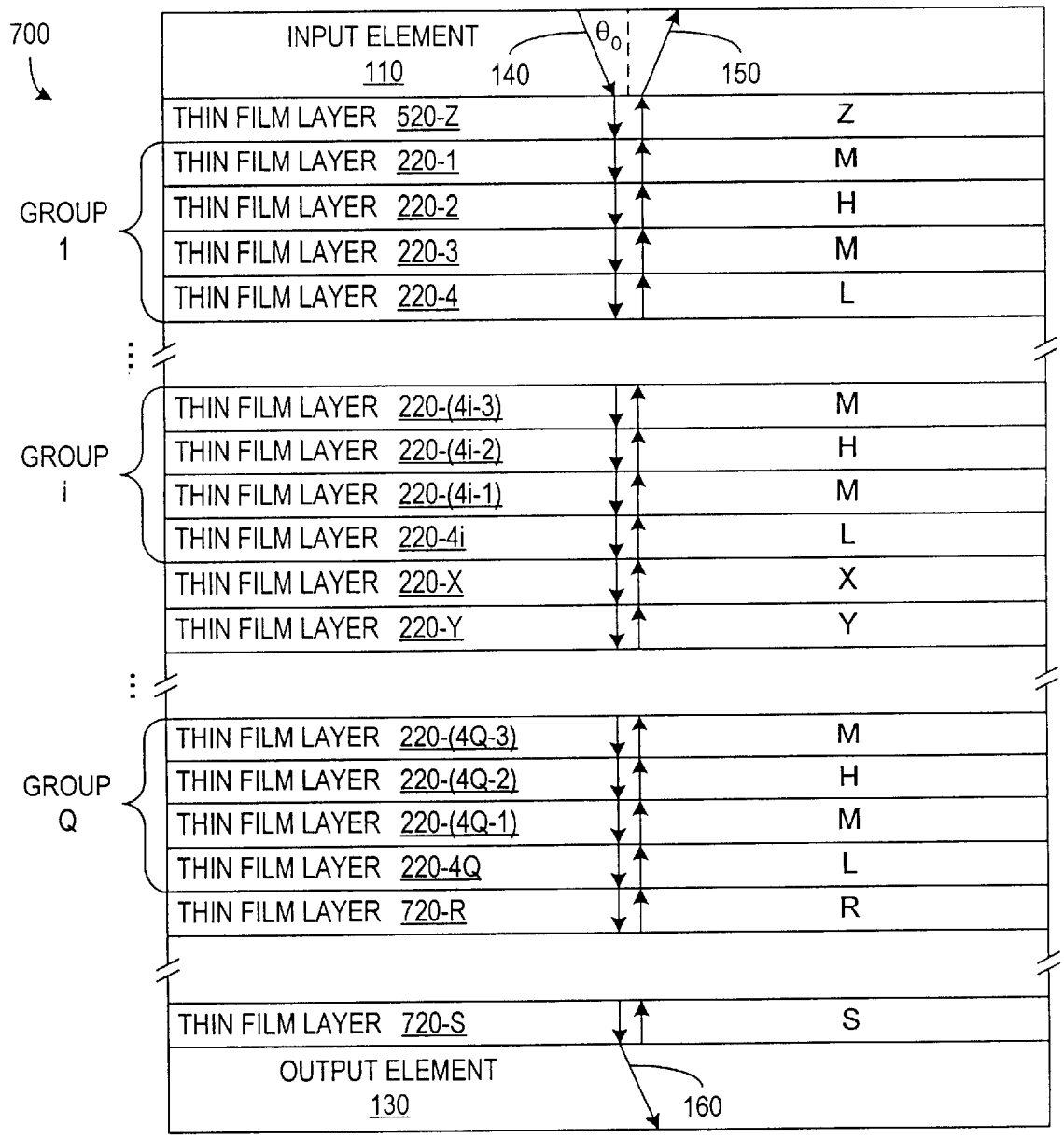
FIG. 7 shows an immersed non-polarizing beamsplitter in accordance with an embodiment of the invention having additional thin films after a series of repeated thin film groups.

FIG. 7 shows yet another non-polarizing beamsplitter 700 in accordance with an embodiment of the invention having one or more additional quarter-wave thin films 720-R to 720-S following Q thin film groups. Non-polarizing beamsplitter 700 optionally includes even numbers of additional thin films 220-X to 220-Y between one or more pair of adjacent thin film groups and/or any number of additional thin films 520-Z preceding the thin film groups. At least one of the additional films 720-R to 720-S, 220-X to 220-Y, and 520-Z has a refractive index that differs from the refractive indices of the materials in the repeated thin film groups, and a theoretical relation between the refractive indices of the additional thin films and the materials in the repeated thin film groups can be derived from Equations 1.

With the aid of a computer program, different beamsplitter coating structures having additional thin films $N_X$, $N_Y$, $N_Z$, $N_R$, and $N_S$ in a variety of positions such as illustrated in FIG. 7 and having thin film groups with a variety of different orders can be evaluated. When a particular immersed beamsplitter coating structure yields a desired performance over a desired wavelength range, a beamsplitter having the structure can be constructed and tested. Manufacturing variations or other undetermined factors can produce non-polarizing beamsplitters that do not achieve the theoretically predicted performance. The structures of FIGS. 4 and 6 with the materials described above do respectively provide 50% and 33% non-polarizing beamsplitters for a wavelength band that is suitable for precision systems such as interferometers.

The program listing appendix includes C language code for programs that determine suitable refractive indices $N_H$, $N_M$, and $N_L$ for the materials H, M, and L in the repeated thin film groups. Each program corresponds to a different thin film structure/order and has the refractive indices (e.g., $N_X$ and $N_Y$) of the additional thin films for the structure corresponding to the program as inputs. Each program generates a table of combinations of refractive indices $N_H$, $N_M$, and $N_L$ that provide a non-polarizing reflection for the corresponding structure/order. The table of refractive indices $N_H$, $N_M$, and $N_L$ can be examined to determine whether any of the combinations can be manufactured using available materials that are suitable for thin films in a non-polarizing beamsplitter.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A non-polarizing beamsplitter comprising:
    a plurality of thin film groups, each thin film group comprising a layer of a first material, two layers of a second material that differs from the first material, and a layer of a third material that differs from the first and second materials; and
    a first additional thin film layer of a fourth material that differs from the first, second, and third materials.

2. The beamsplitter of claim 1, wherein the beamsplitter is an immersed beamsplitter that further comprises a first optical element and a second optical element with the thin film groups and the first additional thin film sandwiched without an air gap between the first and second optical elements.

3. The beamsplitter of claim 1, wherein each of the layers in the thin film groups and the first additional thin film has an optical thickness equal to one-quarter of a wavelength of an incident beam for the beamsplitter.

4. The beamsplitter of claim 1, wherein the first additional thin film layer precedes the thin film groups along a path of a transmitted beam of the beamsplitter.

5. The beamsplitter of claim 4, further comprising an even number of additional thin films that are between an adjacent pair of the thin film groups.

6. The beamsplitter of claim 4, further comprising one or more additional thin films that are after the thin film groups along the transmitted beam of the beamsplitter.

7. The beamsplitter of claim 1, wherein the first additional thin film is between an adjacent pair of the thin film groups.

8. The beamsplitter of claim 7, wherein a structure completely filling space between the adjacent pair of thin film groups consists of an even number of additional thin films including the first additional thin film.

9. The beamsplitter of claim 1, wherein the first additional thin film layer follows after the thin film groups along a path of a light beam traversing the beamsplitter.

10. The beamsplitter of claim 1, wherein
    the layers in at least one of the thin film groups have a first order; and
    the layers in a thin film group that immediately precedes the first additional thin film layer have a second order, the second order differing from the first order in that positions of the layers of the first and third materials in the second order are swapped relative to the first order.

11. A non-polarizing beamsplitter comprising:
a plurality of thin film groups, wherein each thin film group consists of:
  a layer of $TiO_2$, which is a first material;
  two layers of $Y_2O_3$, which is a second material; and
  a layer of $MgF_2$, which is a third material; and
a first additional thin film layer of a fourth material that differs from the first, second, and third materials.

12. The beamsplitter of claim 11, wherein the first additional thin film layer is a layer of $Al_2O_3$, which is the fourth material.

13. The beamsplitter of claim 12, further comprising a second additional thin film layer that is adjacent the first additional thin film layer and between.

14. The beamsplitter of claim 13, wherein the second additional thin film layer is a layer of $Y_2O_3$, which is the second material.

15. The beamsplitter of claim 14, wherein the plurality of thin film groups consists of six thin film groups, and the beamsplitter consists of:
an input optical element;
the six thin film groups;
the first additional thin film layer;
the second additional thin film layer; and
an output optical element.

16. The beamsplitter of claim 13, further comprising a third additional thin film layer that precedes the plurality of thin film groups along a path of a transmitted beam of the beamsplitter.

17. The beanisplitter of claim 16, wherein the plurality of thin film groups consists of four thin film groups, and the beamsplitter consists of:
an input optical element;
the third additional thin film layer;
the four thin film groups;
the first additional thin film layer;
the second additional thin film layer; and
an output optical element.

18. The beamsplitter of claim 1, wherein the beamsplitter splits an incident beam that is unpolarized and of a first frequency into a reflected beam and a transmitted beam that are unpolarized and of the first frequency.

19. The beamsplitter of claim 18, wherein each of the layers in the thin film groups and the first additional thin film has an optical thickness equal to one-quarter of a wavelength of the incident beam.

20. The beamsplitter of claim 1, wherein reflection coefficients rs and rp respectively for S-polarized and P-polarized light in the beamsplitter are such that $$rs = \frac{1 - U*W}{1 + U*W}$$
$$rp = \frac{1 - U/W}{1 + U/W}$$

for factors U and W that depend on refractive indices of the first, second, third, and fourth materials, and wherein the beamsplitter has an overall structure such that the factor U is equal to 1.

21. The beamsplitter of claim 20, wherein:
the plurality of thin film groups comprises Q thin film groups;
the first material has a first refractive index $N_H$;
the second material has a second refractive index $N_M$;
the third material has a third refractive index $N_L$; and
the factor U is a product of multipliers M1 and M2, wherein the multiplier M1 depends on a refractive index of the fourth material, and the multiplier M2 is not equal to 1 and is such that $$M2 = \left(\frac{N_H * N_L}{N_M * N_M}\right)^Q.$$

22. The beamsplitter of claim 1, wherein reflection coefficients rs and rp respectively for S-polarized and P-polarized light in the beamsplitter are such that $$rs = \frac{1 - U*W}{1 + U*W}$$
$$rp = \frac{1 - U/W}{1 + U/W}$$

for factors U and W that depend on refractive indices of the first, second, third, and fourth materials, and wherein the beamsplitter has an overall structure such that the factor W is equal to 1.

23. The beamsplitter of claims 22, wherein:
the plurality of thin film groups comprises Q thin film groups;
a beam that is being split traverses each of the first layers at an angle $\theta_H$ with an axis that is perpendicular to surfaces of the thin film groups;
the beam traverses each of the second layers at an angle $\theta_M$ with the axis;
the beam traverses each of the third layers at an angle $\theta_L$ with the axis; and
the factor W is a product of multipliers M1 and M2, wherein the multiplier M1 depends on an angle at which the beam traverses of the first additional layer, and the multiplier M2 is not equal to 1 and is such that $$M2 = \left(\frac{\cos\theta_H * \cos\theta_L}{\cos\theta_M * \cos\theta_M}\right)^Q.$$

* * * * *